United States Patent [19]
Weichel

[11] 3,793,990
[45] Feb. 26, 1974

[54] APPARATUS FOR MECHANICALLY DISTRIBUTING FEED TO ANIMAL FEEDING STATIONS IN A BARN

[76] Inventor: Ernst Weichel, Postfach 30, Heiningen, Germany

[22] Filed: Feb. 22, 1971

[21] Appl. No.: 117,241

[30] Foreign Application Priority Data
Feb. 21, 1970 Germany............................ 2008141

[52] U.S. Cl. ............................ 119/56 R, 119/52 CF
[51] Int. Cl. .................................................. A01k 5/02
[58] Field of Search ........................... 119/51, 52, 56

[56] References Cited
UNITED STATES PATENTS

| | | | |
|---|---|---|---|
| 3,478,723 | 11/1969 | Berg................................. | 119/52 B |
| 3,508,524 | 4/1970 | Harms............................. | 119/52 AF |
| 3,225,742 | 12/1965 | Hagans........................... | 119/56 R X |
| 2,175,960 | 10/1939 | Herrington..................... | 119/56 R |
| 3,144,173 | 8/1964 | France et al..................... | 119/56 R |
| 3,325,055 | 6/1967 | Marshall......................... | 119/56 R |
| 3,534,709 | 10/1970 | Thompson...................... | 119/56 R |
| 1,342,456 | 6/1920 | Nagel............................... | 119/56 R |
| 3,123,050 | 3/1964 | Haen................................ | 119/52 B |
| 3,428,027 | 2/1969 | Haen et al...................... | 119/52 B |

*Primary Examiner*—Aldrich F. Medbery
*Attorney, Agent, or Firm*—Toren & McGeady

[57] ABSTRACT

In an apparatus for mechanically distributing feed to spaced animal feeding stations in a barn and the like, an endless belt or chain conveyor is positioned within a housing so that at least its sides and bottom are enclosed and the housing forms a trough through which feed is delivered to the feeding stations. Longitudinally and transversely spaced prong-like extensions are secured to the conveyor and they depend from the lower surface of the conveyor to almost the bottom of the trough so that the extensions move the feed through the trough. The bottom surface of the trough is pivotally connected to the remainder of the housing for selectively discharging feed to the feeding stations.

24 Claims, 6 Drawing Figures

PATENTED FEB 26 1974 3,793,990

INVENTOR:
ERNST WEICHEL
BY:
Toren & McGeady
ATTORNEYS

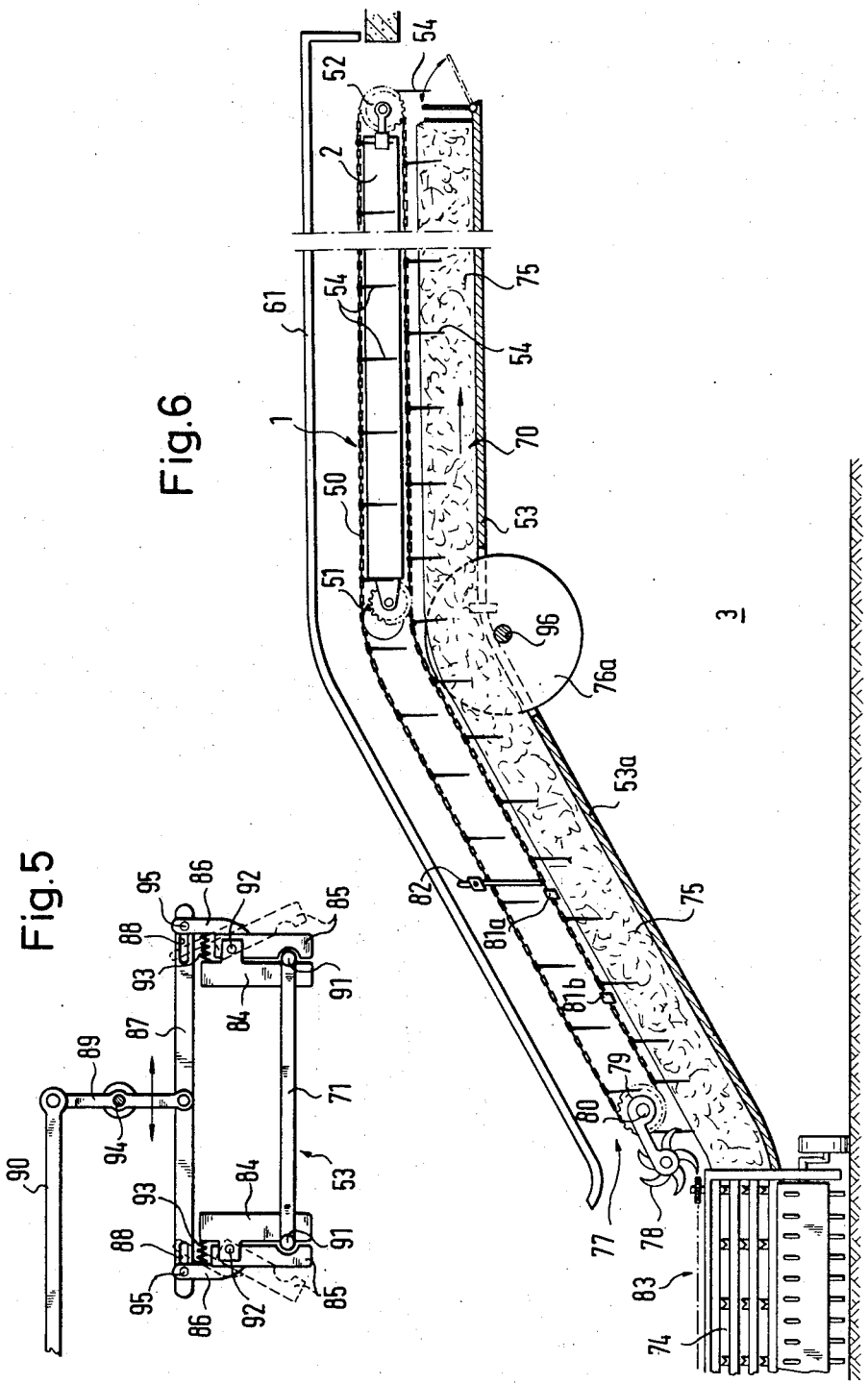

APPARATUS FOR MECHANICALLY DISTRIBUTING FEED TO ANIMAL FEEDING STATIONS IN A BARN

SUMMARY OF THE INVENTION

The present invention is directed to apparatus for mechanically distributing feed to spaced animal feeding stations in a barn and, more particularly, it is directed to the arrangement of a conveyor located within a housing which forms a trough so that the feed is conveyed through the trough by the conveyor to the feeding stations. Further, the conveyor and housing are located within the barn so that they are out of the path of movement of the animals and also so that the feed is discharged downwardly into the feeding stations.

In German patent No. 1,657,086.8 a conveyor feed arrangement is disclosed in which the conveyor is pivoted about an axis parallel to the direction of travel of the feed so that when it is pivoted the feed supported on it drops into the feeding stations. Since the entire conveyor arrangement is pivotally mounted, a rather complicated support construction is required which may be susceptible of various problems. In this arrangement the conveyor tends to run under the material, particularly when the material is light and bulky, with the result that the manner of conveying the feed is unsatisfactory.

In another known arrangement, a longitudinally extending conveyor is positioned above an oblong feeding station for moving the feed into the range of the stations. This conveyor includes a trough having a hinged bottom which is closed while the feed is moved through the trough and it is held in place by a lock. To discharge the feed the trough can be opened downwardly about an axis parallel to the movement of the feed, preferably through an automatic release, and the trough is raised again by mechanical means over followers connected to the conveyor drive. This arrangement has the disadvantage that the movement of the feed is effected by a known reciprocating push-rod-conveyor having followers which turn back and forth as the material is conveyed through the trough and this conveyor movement not only prevents the trough from being filled completely, but it also prevents a uniform distribution of the feed within the trough. Further, such a pushrod-conveyor is suitable only for chopped material, because uncut material works its way to the top or upper side of the followers and becomes stuck there. As a result, the uncut feed material cannot be dropped into the feeding station when the bottom of the trough is folded into the open position. Another disadvantage of this arrangement is that it can be used only for a single row of feeding stations and the moving joints located in the conveyor trough have a tendency to foul and corrode and frequently they are covered with lubricants. These joints are difficult to clean and, at least in the case of certain feeds, lead to the contamination of the feed.

Therefore, it is the primary object of the present invention to improve the arrangement disclosed in German patent 1,657,086.8 so that the mass of the pivotal parts associated with the conveyor are located as low as possible and also so that the conveyor works safely with any kind of stalk material or other feeds and can be emptied completely. Further, the arrangement embodying the present invention is easy to manufacture, assemble and clean. In addition, the disadvantages set forth above for the known longitudinal conveyor can also be avoided.

In accordance with the present invention, an arrangement is provided for mechanically distributing feed to different feeding stations in a barn and the like in which a conveyor in combination with a housing forms a trough for conveying the feed to the feeding stations. The conveyor and housing are located above the feeding stations and outside of the area through which the animals move. For discharging the feed from the trough it has a lower surface which can be pivoted about an axis extending parallel with the direction of travel of the feed so that the feed drops into the feeding stations. The conveyor can be an endless belt or chain conveyor having prong-like extensions secured to and extending outwardly from the conveyor surface so that the extensions depend from the lower surface of the conveyor toward the bottom of the trough and the height of the extensions is such that they extend almost to the bottom surface of the trough and effectively move the feed to the desired locations above the feeding stations.

Another feature of the invention is the manner in which the bottom surface of the housing is pivotally mounted so that it can be pivoted about one or both sides.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 5 is a detailed view, on enlarged scale, of a portion of the conveyor arrangement shown in FIG. 4; and FIG. 6 is a longitudinal view, partly in section, of yet another embodiment of the present invention.

DETAILED DESCRIPTION OF THE INVENTION

Figure 1:
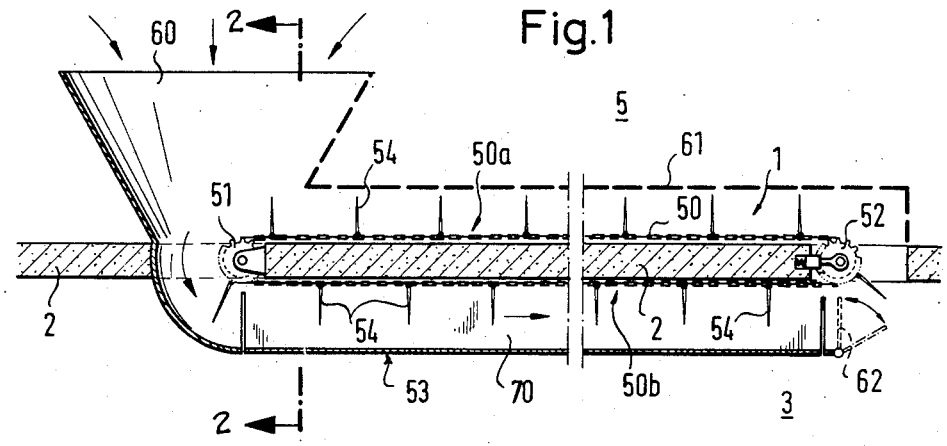
FIG. 1 is a longitudinal sectional view of a feed conveyor arrangement embodying the present invention.

In the different embodiments shown in the drawings the same reference numerals have been used to identify similar elements.

Figure 2:
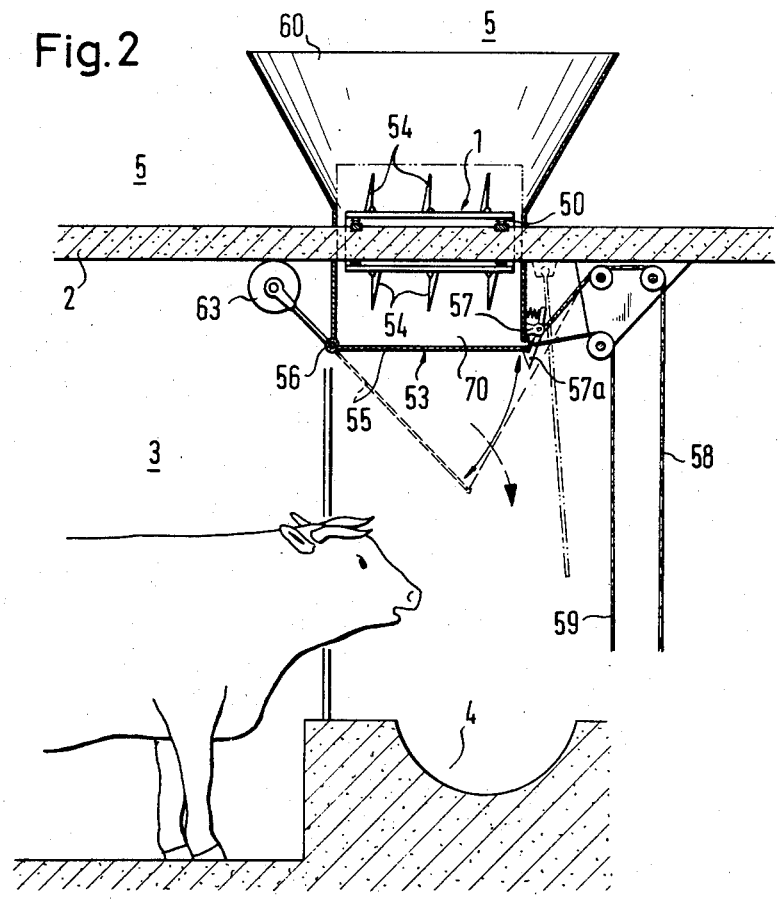
FIG. 2 is a transverse cross sectional view of the conveyor shown in FIG. 1 taken on lines 2—2 indicating the relative positions of the conveyor and the feeding station.
Figure 3:
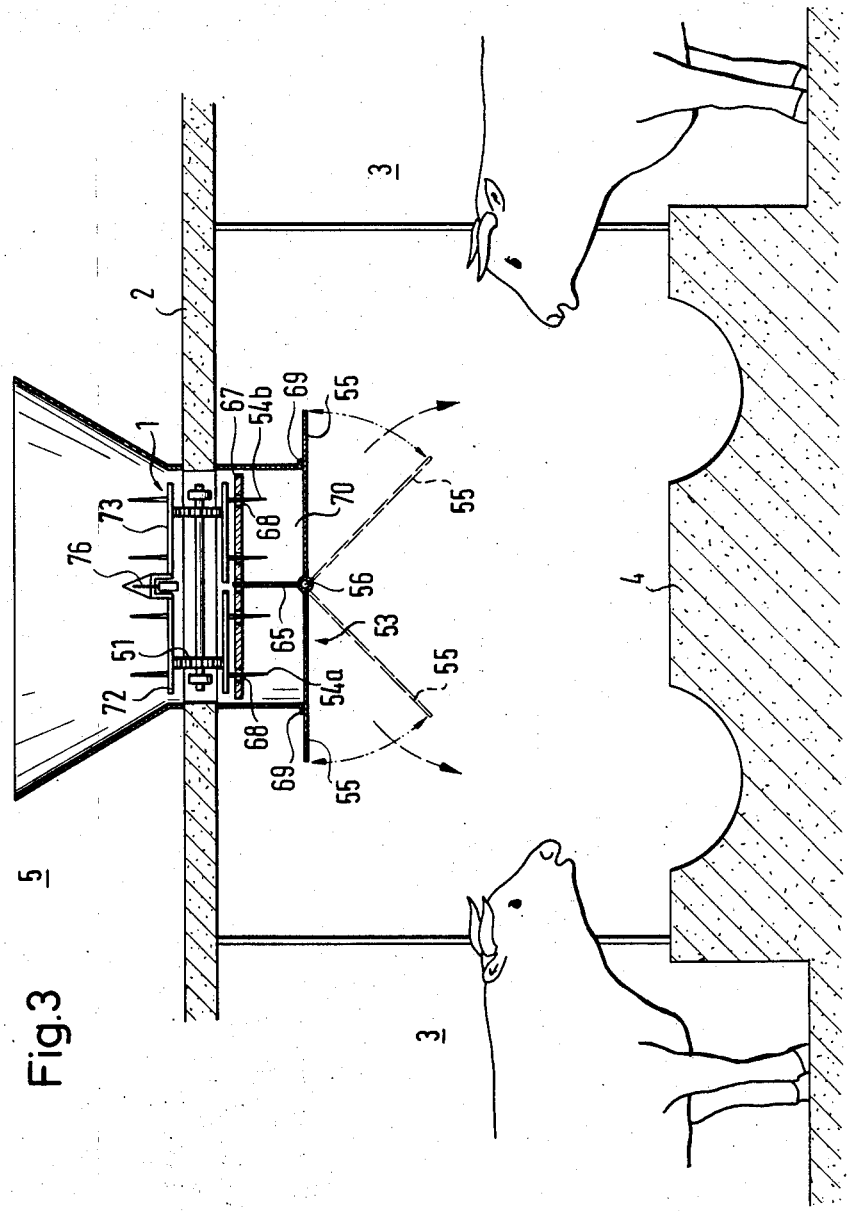
FIG. 3 is another transverse cross sectional view of a further conveyor arrangement embodying the present invention.
Figure 4:
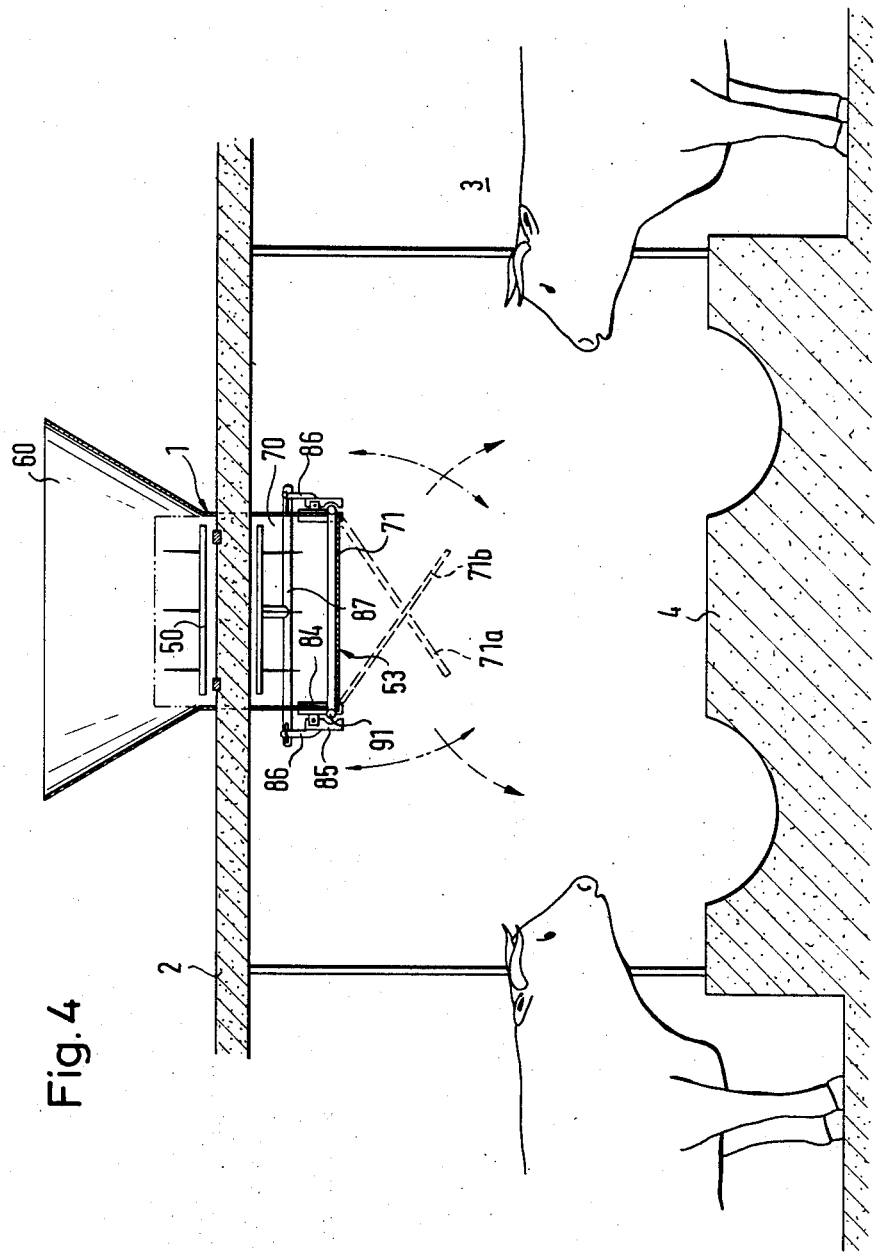
FIG. 4 is still another transverse cross sectional view of a conveyor arrangement in accordance with the present invention.

In the drawing, a conveyor 1 is positioned in the plane of the ceiling 2 of a barn 3. In FIGS. 2, 3 and 4 a feeding station 4 is shown aligned below the conveyor 1. The feeding station may be in the form of a table, trough or rack. The space above the ceiling forms a feed chamber 5.

The conveyor 1 may be a belt or chain conveyor and is illustrated in the drawing as a chain conveyor including at least one endless chain 50 traveling over spaced guide or driving rollers 51 and 52 and is located within a conveyor housing 53 which encloses at least the sides and bottom of the conveyor and forms a trough 70. Secured to the revolving chain 50 are a plurality of prong- or bar-shaped extensions 54 which move the feed material through the trough formed between the lower surface 50b of the conveyor and the bottom of the trough. As indicated in FIGS. 1 and 2, the extensions 54 are spaced in the longitudinal and transverse direction providing a plurality of longitudinally extending rows. The bottom and lateral enclosure of the conveyor by the housing 53 assures that no feed can drop off or out of the sides of the trough. The bottom portion of the housing 53 is provided with flaps 55 pivoted on hinges 56 which extend along the lower edge of the housing in the direction parallel with the movement of the feed effected by the conveyor. Additionally, it is possible to pivot the entire bottom of the trough about hinges 56. As indicated in FIG. 2, the hinge 56 is positioned along one lower edge of the trough 70 and a releasable locking member 57 is located along the opposite lower edge of the trough. A lifting cable 58 is secured to the flap 55 and passes over pulleys for returning the flap 55 or the entire bottom surface of the housing 53 to the closed position. The locking member 57 includes spring-loaded hooks 57a which secure the flap 55 or the bottom surface of the housing in place when it is lifted by the cable 58. Another cable 59 is shown in FIG. 2 passing over a pulley and being connected to the locking member 57 for releasing the locking hook 57a and dropping the flap or bottom surface of the housing.

At one end a hopper 60 is incorporated with the conveyor housing for charging the feed onto the conveyor from the feed chamber 5. As indicated in FIG. 1, the housing 53 can be closed at the top to provide a cover above the upper run or surface of the conveyor 1 so that it is completely enclosed, such as by a cover 61. However, the cover can be omitted even if the upper surface of the conveyor is used for transporting the feed material. If a cover 61 is provided above the conveyor, then a known device can be employed for tilting the conveyor extensions 54 as they pass along the upper surface of the conveyor for saving space as the extensions travel along the upper surface of the conveyor between the rollers 52 and 51. In FIG. 6, the conveyor extensions are connected in a known manner to the conveyor chain over so-called controlled traverses so that the conveyor extensions depend downwardly from both the upper and lower runs of the chain 50. This arrangement saves space and permits a good engagement and release of the feed at the beginning and end of the conveyor path even when dense stalk material is being fed by the conveyor.

In FIG. 1 a spring loaded flap 62 is provided which remains in the closed position when no feed is being conveyed.

It is possible to arrange the flaps 55 so they can be operated simultaneously or independently of one another. The independent operation is desirable, for example, if all of the feeding stations are not in use. In accordance with the invention, the conveyor is arranged for operation in both directions so that, after the flaps 55 have been moved into the locked position, any of the feed which remains in the trough 70 can be removed during the next conveying operation. In FIG. 2 a single row of feeding stations are located under the conveyor arrangement, however, in FIG. 3 two rows of feeding stations are located in a common feed table. To provide discharge of the feed into the feed stations shown in FIG. 3, two rows of flaps 55 are provided along the lower surface of the housing 53 with a common hinge 56 arranged in the longitudinal center of the lower surface. To prevent long-staple feed from falling primarily to one side or the other, a vertical partition 65 extends upwardly from the location of the hinge 56 and divides the trough in half. In this arrangement, the longitudinally extending, vertical partition 65 is located between two adjacent rows of extensions 54 and, as can be seen in FIG. 3, two rows of conveyor extensions 54a, 54b are provided on each side of the trough so that two trough compartments are provided with flaps 55 opening from each of the compartments.

The extensions 54 have an arrow-like or conically shaped configuration so that even compacted felt-like stalk or leaf material can be easily separated. However, when chopped or granular feed is used, the extensions 54 can have a bar-like shape.

If a conveyor arrangement is used having a partition 65 for conveying compacted felt-like material, it is advisable to provide a cutting device 76 in cooperative relationship with the partition 65, such as a bar cutter, see FIG. 3, or a cutting disk 76a, see FIG. 6, which cuts the material fed to the conveyor into sections so that it can be introduced into each of the individual compartments making up the trough 70 on the opposite sides of the partition 65. In this manner the cut material can then be conveyed through the trough by the extensions 54a and 54b.

As indicated in FIG. 3, a slotted cover or plate 67 can be positioned below and adjacent the lower surface 50b of the conveyor so that the prong-shaped extensions 54 extend through the slots 68 provided in the cover 67 and extend toward the bottom surface of the trough. This arrangement is particularly suitable for feeding partly compressed hay. In the arrangements shown in FIGS. 1 to 3 the conveyor 1 is positioned in the plane of the ceiling of the barn, however, other similar arrangements can be provided with the conveyor located below the ceiling, however, such arrangements do not have the space saving characterisitc of the embodiments described above.

Stops 69 can be used to limit the path of the flaps 55. If balancing weights 63, such as shown in FIG. 2, are used the ceiling 2 can act as a stop and the flaps are brought back into the closed position of the trough by the weights 63 after the feed has dropped from the flap into the feeding station.

FIGS. 4 and 5 show still another embodiment of a chain conveyor 1 in a barn having two side by side rows of feeding stations which differs from the arrangement in FIG. 3, since the trough 70 is provided without a longitudinally extending center partition. The bottom surface of the housing 53 is arranged as a one-part flap 71 which is detachably mounted in journals 91 along both of the longitudinally extending sides of the housing. The journals 91 holding the edges of the flaps 71 consist of stationary bearing members 84 and an articulated bearing flap 85. The bearing flap is pivotally supported on a hinge 92, note FIG. 5, and springs 93 bias the bearing flaps toward the bearing members 84. A lug 86 extends upwardly from each of the bearing flaps and is secured to a pushrod 87. By means of a shifting bar 90, which can be operated manually or mechanically, a shifting lever 89, articulated to the pushrod and rotatably mounted on a fixed point 94 of the bar 90, permits the displacement of the pushrod so that one of the bearing flaps 85 can be released permitting the flap 71 to open from one side of the trough while it is held in place by the journal 91 on the opposite side of the trough. Accordingly, as shown in FIG. 4, by displacing the pushrod 87 transversely of the direction of movement through the conveyor, the flap 71 can be made to open either on the right side or the left side, note the dashed lines indicating flaps 71a, 71b, respectively.

To afford the opening of the flaps on one side while retaining the other edge of the flap, the pushrod 87 is provided with oblong slots 88 with journals 95 secured to the lugs 86 of the bearing flaps 85 being secured within the oblong slots. When the flap 71 is in the closed position, held between the bearing members 84 and the bearing flaps 85, the journals 95 are positioned in contact with the outer ends of the oblong slots in the pushrod 87. If the pushrod 87 is moved to the right by means of the shifting bar 90 and its lever 89, it causes the lug 86 on the left hand side of the trough to pivot the bearing flap 85 about the hinge 92 so that the flap 71 can be opened on the left hand side. As the bearing rod 87 moves to the right it does not cause any displacement of the bearing flap on the right hand side and the flap 71 remains secured between the right hand bearing member 84 and its associated flap 85. Therefore, when the pushrod 87 is moved to the right it opens the left hand side of the flap 71 and, conversely, when it is moved to the left it opens the right hand side of the flap.

With this arrangement, the hinged flap 71 can be opened alternately on its opposite sides, for example, first into the position 71a and then into the position 71b so that first the right hand feeding stations are supplied with feed and then the left hand feeding stations are filled.

As mentioned above, FIG. 6 shows an arrangement of the chain conveyor 1 with the conveyor extensions 54 depending downwardly from both the upper and lower surfaces or runs of the conveyor. In this arrangement, a portion of the conveyor housing 53a extends laterally from the barn 3 and is positioned obliquely between the ceiling of the barn and the adjacent floor on which the feed material is handled by a known dosing device 83. Further, the material can be supplied by the cross belts 74 in a pre-shaped, compressed form for movement obliquely upwardly to the trough 70. If the conveyor 1, shown in FIG. 6, is used for a double row of feeding stations, a cutting disk 76a can be employed in place of the cutter beam shown in FIG. 3 for separating the rope-like material 75 which is used as the feed. In this arrangement the axis of rotation 96 of the cutting disk 76a is located below the housing 53 and a part of the circumference of the cutting disk extends upwardly to the level of the rope-like material in the path of the partition 65, not shown in FIG. 6. The cutting disk 76a extends through a slot in the housing 53 and the housing extension 53a for dividing the feed material into two equal parts.

Another feature of the invention is the possibility to operate the conveyor 1 in dependence on the output or capacity of the cross belt 74 which is supplying the rope-like feed material. To provide this related driving action, a drive shaft 80 of the conveyor 1 is driven by a known drive means 77, controlled by the material, which action is afforded through a known measuring wheel 78 and a clutch 79 only when the rope-like feed material 75 exits from the cross belt 74 and moves in the direction of conveyance, that is the cross belt 74 or dosing device 83 supply additional amounts of feed to the conveyor. This prevents the occurance of differences in conveying speed between the cross belt and the conveyor which avoids any interruption in the feeding of the feed material or in the feed material being torn apart. To provide the proper distribution of the feed material, when the barn has a number of transverse corridors or when all the feeding stations are not occupied, a control device is indicated schematically in FIG. 6 by which the feed of the material can be interrupted at any time at selected locations along the conveyor.

By providing the conveyor chain 50 with spaced cams 81a, 81b located at any desired interval, it is possible to selectively regulate the supply of the feed material from the combination of the dosing device 83 and the cross belt 74 when the cams open or close the switch 82. However, though the supply of the feed material is discontinued, the chain 50 continuous to operate since the clutch 79 remains engaged. If cam 81a discontinues the supply of feed material, the chain conveyor will continue to move until the cam 81b actuates the switch 82 and again commences the feed of material into the conveyor. If the material does not enter the conveyor, then the extensions 54 do not move any of the material through the trough. By selectively arranging the cams, the rope-like feed material can be arranged at selected locations along the conveyor so that it is properly positioned for discharge into selected feeding stations. By the staggered arrangement of the cams 81a, 81b the same locations along the trough 70 can always be maintained free of feed material.

By charging the conveyor 1 with pre-shaped quantities of rope-like stalk and leaf material there is the advantage that the same amount of feed is always automatically alotted to each animal and the feed ration can be arranged in the trough 70 with smaller dimensions than are required for loose-bulk material and thereby permitting a space saving and low cost construction of the conveyor arrangement.

DESCRIPTION OF THE OPERATION OF THE INVENTION

The conveyor 1 is started up at a constant or regulable velocity of feed and is charged either manually from a feed supply located at the hopper end of the conveyor or from a transport car filled with feed, or, as shown in FIG. 6, from a dosing device 83 with or without a cross belt 74, or other means can be used for supplying feed. The feed supplied into the conveyor is moved by the extensions 54 from the conveyor through the trough 70 until the feed material is transported to the feeding station most remote from the point of supply.

When the conveyor chain has advanced or moved an amount corresponding to the length of the conveyor, a limit switch, not shown, for the conveyor chain 50 is operated to discontinue the chain drive and by other appropriate means the flaps or bottom surface of the housing 53 are opened and the material is discharged into the selected feeding stations. The opening of the flaps or bottom surface of the housing can be effected by simply releasing the locking means by manual or mechanical operation, for example by magnets under the action of gravity or by known cable means or pushrods or other gears and also hydraulic or pneumatic cylinders can be used. In the case of hydraulic or pneumatic cylinders the tilting speed is adjustable and the operation can be carried out without any noise and vibration.

After alotting a certain time for the feed material to detach itself from the prong-like extensions on the conveyor and to slide downwardly into the feeding stations, the housing is again closed by the counterweights 63 or by cable winch 58 and it is again secured in the locked position. If mechanically operated winches, gears or cylinders are used for lowering the flaps or bottom surface of the housing, the closing of these parts can also be effected by the same means.

After the conveyor housing is moved into the normal conveying position, the conveyor remains inoperative until the next portion of the feed is to be transported to the feeding stations and this operation can be accomplished either by hand or by means of a timer. It is not necessary to return the conveyor chain 50 into its starting position by moving it through half its length, if a second switch is arranged to be operated when the chain is again restarted. In such an arrangement the rope-like material or other feed is at the end of the conveyor 1.

By the use of known switching connections between the conveyor 1 and the supply means for delivering the feed into the conveyor, it is possible to start up and shut down these units simultaneously and a predetermined feeding program can be carried out fully automatically so that the feeding operation does not require the presence of an attendant. Accordingly, this arrangement permits a considerable savings in both time and labor and represents a substantial improvement over the prior art.

While specific embodiments of the invention have been shown and described in detail to illustrate the application of the inventive principles, it will be understood that the invention may be embodied otherwise without departing from such principles.

What is claimed is:

1. Apparatus for the mechanical distribution of feed to animal feeding stations in barns, stables and the like, comprising a conveyor, a housing enclosing at least the sides and bottom of said conveyor, spaced therefrom and forming a trough below said conveyor, said trough extending between the feeding stations and a feed loading station with said trough located above the feeding stations and out of the path of movement of the animals in the feeding stations, the improvement including the relationship that said housing is a stationary member and that the sides of said housing are located laterally outwardly from said conveyor and extend above and below said conveyor and the bottom thereof is imperforate and forms a continuous closed surface extending across the lower ends of the sides below said conveyor so that said trough formed by the sides and bottom of said housing prevents feed from dropping off or out of the sides of said trough or through its bottom, said conveyor is an endless travelling member arranged to move longitudinally through and above the bottom of said trough and having spaced extensions secured at one end to said travelling member and arranged to extend downwardly from the surface of said travelling member directed downwardly toward the bottom of said trough, said extensions having a height for extending between said travelling member and a plane spaced above the bottom of said trough so that the feed within said trough can be moved along by said extensions without being obstructed by the bottom of said trough, and said bottom is secured to said sides with at least individual portions of said bottom being pivotally displaceable about an axis extending in the direction of movement of said conveyor for charging the material downwardly from said trough into the feeding station and said pivotally displaceable individual portions of said bottom are returnable into position for closing said trough.

2. Apparatus, as set forth in claim 1, characterized in that said traveling member is an endless belt and includes rollers at the opposite ends of said conveyor over which said endless belt passes.

3. Apparatus, as set forth in claim 2, characterized in that said extensions are spaced longitudinally and transversely on the surface of said traveling member with at least two longitudinally extending rows of said extensions being provided.

4. Apparatus, as set forth in claim 3, characterized in that said extensions having a prong-shaped configuration.

5. Apparatus, as set forth in claim 4, characterized in that said prong-shaped extensions having their surfaces converging from said traveling member toward a pointed end spaced from said traveling member.

6. Apparatus, as set forth in claim 1, characterized in that said traveling member having an upper surface and a lower surface with the lower surface directed downwardly toward the bottom surface of said trough, a plate slotted in the direction of travel of said traveling member positioned within said trough between the lower surface of said traveling member and the bottom surface of said trough, said extensions extending downwardly from the lower surface of said traveling member through the slots in said plate into said trough.

7. Apparatus, as set forth in claim 1, characterized in that a hinge extends longitudinally along the bottom surface of said housing spaced inwardly from the sides of said housing, and said bottom surface of said housing is formed by a plurality of flaps pivotally mounted on said hinge so that the opposite sides of said trough can be opened selectively for discharging feed material to laterally spaced feed stations below said conveyor.

8. Apparatus, as set forth in claim 7, characterized in that a longitudinally extends vertical partition extending upwardly from the bottom of said housing for dividing said trough into two trough compartments.

9. Apparatus, as set forth in claim 1, characterized in that said conveyor includes spaced rollers located at the ends of said conveyor and arranged to be positioned in the plane of the ceiling of the structure containing said conveyor.

10. Apparatus, as set forth in claim 9, characterized in that means forming a feed chamber are arranged to be located above the ceiling of the structure in which said conveyor is located for supplying the feed material into said conveyor.

11. Apparatus, as set forth in claim 2, characterized in that said traveling member comprises a traveling chain having an upper section and a lower section, said extensions being secured to said traveling chain so that they depend downwardly from the lower section of said chain into said trough.

12. Apparatus, as set forth in claim 11, characterized in that means are arranged for displacing said extensions from the normally downwardly disposed position on the lower section of said traveling chain to a downwardly depending position from the upper section of said traveling chain.

13. Apparatus, as set forth in claim 11, characterized in that at least two longitudinally extending transversely spaced rows of said extensions are secured to said traveling chain.

14. Apparatus, as set forth in claim 1, characterized in that stops being provided for limiting the pivotal displacement of the bottom surface of said housing.

15. Apparatus, as set forth in claim 14, wherein the bottom surface of said housing comprises a number of pivotally mounted flaps, counter balancing weights associated with said flaps for displacing said flaps into the closed position when the feed material has been displaced from said trough into the feeding stations.

16. Apparatus, as set forth in claim 1, characterized in that the bottom surface of said housing comprises a plurality of flaps, and lifting means secured to said flaps for displacing said flaps between the opened and closed positions.

17. Apparatus, as set forth in claim 11, characterized in that individual rows of extensions are secured to said traveling chains, and means for driving said rows of extensions independently of one another.

18. Apparatus, as set forth in claim 17, characterized in that the upper ends of said extensions are secured to said chain in the upper and lower sections thereof.

19. Apparatus, as set forth in claim 18, characterized in that said extensions have a downwardly converging configuration terminating in a pointed shaped end.

20. Apparatus, as set forth in claim 1, characterized in that means are arranged at the inlet end of said conveyor for supplying a pre-shaped rope-like section of feed material of uniform density to said conveyor.

21. Apparatus, as set forth in claim 20, characterized in that driving means are provided for said conveyor, control means for regulating said driving means in dependence on the supply of said rope-like feed material to said conveyor.

22. Apparatus, as set forth in claim 21, characterized in that a cutting device is positioned along the longitudinal center of said lower trough for separating the feed material into substantially equal parts.

23. Apparatus, as set forth in claim 1, characterized in that cams are associated with said conveyor, switch means arranged in the path of said conveyor to be opened and closed by said cams, and control means associated with said switch for regulating the supply of feed material to said conveyor as said switch is opened and closed.

24. Apparatus, as set forth in claim 1, characterized in that the pivotally displaceable portions of the bottom of said housing are releasably secured along at least one longitudinally extending edge to the corresponding side of said housing, means for locking said edge of said bottom in the closed position, and means for selectively unlatching said locking means along one edge so that it can be pivoted downwardly about the opposite edge.

* * * * *